US009147229B2

(12) United States Patent
Zou et al.

(10) Patent No.: US 9,147,229 B2
(45) Date of Patent: Sep. 29, 2015

(54) METHOD AND SYSTEM FOR IMAGE DENOISING USING DISCRETE TOTAL VARIATION (TV) MINIMIZATION WITH ONE-DIRECTION CONDITION

(75) Inventors: Yu Zou, Naperville, IL (US); Daxin Shi, Vernon Hills, IL (US)

(73) Assignees: KABUSHIKI KAISHA TOSHIBA, Tokyo (JP); TOSHIBA MEDICAL SYSTEMS CORPORATION, Otawara-Shi (JP)

( * ) Notice: Subject to any disclaimer, the term of this patent is extended or adjusted under 35 U.S.C. 154(b) by 513 days.

(21) Appl. No.: 13/354,851

(22) Filed: Jan. 20, 2012

(65) Prior Publication Data

US 2013/0188847 A1    Jul. 25, 2013

(51) Int. Cl.
| | |
|---|---|
| G06K 9/00 | (2006.01) |
| G06K 9/40 | (2006.01) |
| G06T 11/00 | (2006.01) |
| G06T 5/00 | (2006.01) |

(52) U.S. Cl.
CPC ............... *G06T 5/002* (2013.01); *G06T 11/006* (2013.01); *G06T 2207/10081* (2013.01); *G06T 2211/424* (2013.01)

(58) Field of Classification Search
None
See application file for complete search history.

(56) References Cited

U.S. PATENT DOCUMENTS

| | | | | |
|---|---|---|---|---|
| 7,142,705 | B2 * | 11/2006 | Inoue et al. | 382/132 |
| 7,929,747 | B2 * | 4/2011 | Chen | 382/131 |
| 8,005,184 | B2 * | 8/2011 | Chen | 378/4 |
| 8,315,357 | B2 * | 11/2012 | Zhu et al. | 378/65 |
| 8,792,700 | B2 * | 7/2014 | Riddell et al. | 382/131 |
| 2005/0135699 | A1 * | 6/2005 | Anderson | 382/261 |
| 2005/0135700 | A1 * | 6/2005 | Anderson | 382/261 |
| 2007/0248255 | A1 * | 10/2007 | Chen | 382/131 |
| 2008/0240559 | A1 * | 10/2008 | Malvar | 382/167 |
| 2008/0267484 | A1 * | 10/2008 | Chen | 382/132 |
| 2011/0044546 | A1 * | 2/2011 | Pan et al. | 382/195 |
| 2011/0085643 | A1 * | 4/2011 | Zhu et al. | 378/65 |
| 2011/0142316 | A1 * | 6/2011 | Wang et al. | 382/131 |
| 2011/0164031 | A1 * | 7/2011 | Shi | 345/419 |
| 2011/0282181 | A1 * | 11/2011 | Wang et al. | 600/407 |
| 2012/0027281 | A1 * | 2/2012 | Jang et al. | 382/131 |

(Continued)

OTHER PUBLICATIONS

Li, Yuying and Santosa, Fadil, "A Computational Algorithm for Minimizing Total Variation in Image Restoration", IEEE Transactions on Image Processing, vol. 5, No. 6, Jun. 1996, pp. 987-995.

(Continued)

*Primary Examiner* — Randolph I Chu
(74) *Attorney, Agent, or Firm* — Yoshida & Associates, LLC (57) ABSTRACT

In the CT imaging system, a one-direction condition improves noise uniformity in the denoised images and avoids over smoothing in the low noise regions in an image, assuming that the image originally has an unequal noise distribution. On the other hand, the discrete gradients of total variation (DTV) minimization results in an improved edge preserving effects in comparison to the conventional total variation (TV) minimization. Using DTV, the pixel values on an edge will not be substantially affected after a certain denoising treatment. The difference between the DTV minimization and the conventional TV minimization is substantially negligible for strong edges while the DTV minimization substantially improves in preserving the weak edges. DTV keeps the original values while TV slightly smoothes the values for the pixel near the bottom and top of edges.

28 Claims, 9 Drawing Sheets

(56) References Cited

U.S. PATENT DOCUMENTS

| | | | |
|---|---|---|---|
| 2012/0057770 A1* | 3/2012 | Jang et al. | 382/132 |
| 2012/0128265 A1* | 5/2012 | Silver et al. | 382/275 |
| 2013/0077843 A1* | 3/2013 | Bruder et al. | 382/131 |
| 2013/0083886 A1* | 4/2013 | Carmi et al. | 378/16 |
| 2013/0188847 A1* | 7/2013 | Zou et al. | 382/131 |
| 2014/0023253 A1* | 1/2014 | Hesthaven et al. | 382/131 |

OTHER PUBLICATIONS

Mendrik, Adriënne M., Vonken, Evert-Jan, Rutten, Annemarieke, Viergever, Max A. and van Ginneken, Bram, "Noise Reduction in Computed Tomography Scans Using 3-D Anisotropic Hybrid Diffusion With Continuous Switch", IEEE Transactions on Medical Imaging, vol. 28, No. 10, Oct. 2009, pp. 1585-1594.

Nambu, K., and Iseki, H., "A Noise Reduction Method Based on a Statistical Test of High Dimensional Pixel Vectors for Dynamic and Volumetric Images", Rivista di Neuroradiologia, 18:21-33, 2005.

Tomasi, C. and Manduchi, R., "Bilateral Filtering for Gray and Color Images", Proceedings of the 1998 IEEE International Conference on Computer Vision, Bombay, India, 1998, pp. 839-846.

* cited by examiner

METHOD AND SYSTEM FOR IMAGE DENOISING USING DISCRETE TOTAL VARIATION (TV) MINIMIZATION WITH ONE-DIRECTION CONDITION

FIELD OF THE INVENTION

The current invention is generally related to an image processing method and system for image denoising which is optionally used in combination with an iterative reconstruction algorithm.

BACKGROUND OF THE INVENTION

For image reconstruction in CT, an iterative algorithm may include a total variation (TV) minimization. For example, some techniques have been based upon the ordered subset simultaneous algebraic reconstruction technique (OSSART), and the simultaneous algebraic reconstruction (SART). The TV minimization may also be applied to images reconstructed with an analytical algorithm such as filtered backprojection (FBP), to reduce the noise.

Despite the prior art efforts, some problems remain unsolved and require improvement. Prior art efforts generally reduce noise quite uniformly in images except for edges. In other words, although the noise may be reduced based upon a total variation (TV) minimization, the resultant image may be excessively smoothed in some regions while the other regions may be still noisy if the original image has a non-uniform distribution. On the other hand, when prior art is applied to images with subtle edges, the edges may be smoothed out. It appears that prior art total variation (TV) minimization cannot improve the noise without sacrificing spatial resolution in some cases an original image has a non-uniform noise distribution that is common in clinical applications.

Furthermore, there are some odd pixel clusters in noisy images where the HU values are $2\sigma$ to $3\sigma$ off the mean value and are far from their true values. TV minimization leaves these clusters as black/white dots in the denoised images because (1) the "cluster effect" slows down the denoising and (2) the original HU values are far from the true values.

In view of the above discussed prior art problems, a practical solution is still desired for implementing a total variation (TV) minimization algorithm to avoid the overcompensation in the low noise regions and reduce the dots in the high noise pixel clusters.

DETAILED DESCRIPTION OF THE PREFERRED EMBODIMENT(S)

Figure 1:
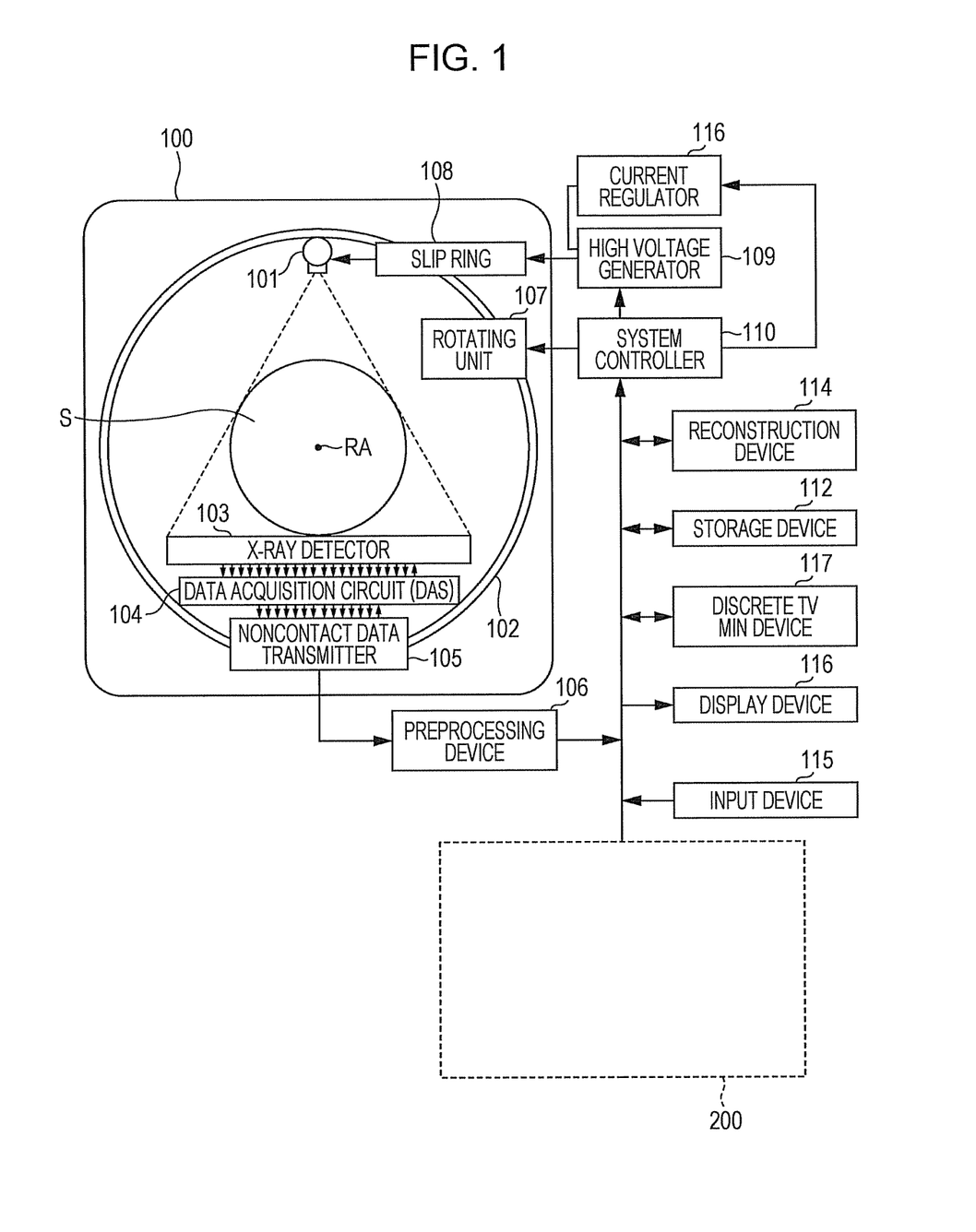
FIG. 1 is a diagram illustrating one embodiment of the multi-slice X-ray CT apparatus or scanner according to the current invention.

Referring now to the drawings, wherein like reference numerals designate corresponding structures throughout the views, and referring in particular to FIG. 1, a diagram illustrates one embodiment of the multi-slice X-ray CT apparatus or scanner according to the current invention including a gantry 100 and other devices or units. The gantry 100 is illustrated from a front view and further includes an X-ray tube 101, an annular frame 102 and a multi-row or two-dimensional array type X-ray detector 103. The X-ray tube 101 and X-ray detector 103 are diametrically mounted across a subject S on the annular frame 102, which rotates around axis RA. A rotating unit 107 rotates the frame 102 at a high speed such as 0.27 sec/rotation while the subject S is being moved along the axis RA into or out of the illustrated page.

The multi-slice X-ray CT apparatus further includes a high voltage generator 109 that applies a tube voltage to the X-ray tube 101 so that the X-ray tube 101 generates X ray. In one embodiment, the high voltage generator 109 is mounted on the frame 102. The X rays are emitted towards the subject S, whose cross sectional area is represented by a circle. The X-ray detector 103 is located at an opposite side from the X-ray tube 101 across the subject S for detecting the emitted X rays that have transmitted through the subject S.

Still referring to FIG. 1, the X-ray CT apparatus or scanner further includes other devices for processing the detected signals from X-ray detector 103. A data acquisition circuit or a Data Acquisition System (DAS) 104 converts a signal output from the X-ray detector 103 for each channel into a voltage signal, amplifies it, and further converts it into a digital signal. The X-ray detector 103 and the DAS 104 are configured to handle a predetermined total number of projections per rotation (TPPR).

The above described data is sent to a preprocessing device 106, which is housed in a console outside the gantry 100 through a non-contact data transmitter 105. The preprocessing device 106 performs certain corrections such as sensitivity correction on the raw data. A storage device 112 then stores the resultant data that is also called projection data at a stage immediately before reconstruction processing. The storage device 112 is connected to a system controller 110 through a data/control bus, together with a reconstruction device 114, a discrete total variation (TV) minimization device 117, a display device 116, an input device 115, and a scan plan support apparatus 200. The scan plan support apparatus 200 includes a function for supporting an imaging technician to develop a scan plan.

One embodiment of the reconstruction device 114 and the discrete total variation (TV) minimization device 117 further include various software and hardware components. According to one aspect of the current invention, the reconstruction device 114 of the CT apparatus reconstructs an image while the discrete TV minimization device 117 advantageously minimizes total variation. In general, the reconstruction device 114 and the discrete TV minimization device 117 in one embodiment of the current invention perform the total variation iterative reconstruction (TVIR) algorithm for reconstructing an image. In further detail, the reconstruction device 114 performs on the projection data an ordered subset simultaneous algebraic reconstruction technique (OSSART) process while the discrete TV minimization device 117 performs a TV minimization process. One embodiment of the reconstruction device 114 and the discrete TV minimization device 117 respectively perform the two processes that are implemented in a main loop where a first predetermined number of iterations is prescribed and in an inner loop where a second predetermined number of iterations is prescribed. In another embodiment, the discrete TV minimization device 117 repeats the inner loop until a predetermined certain condition is achieved.

Before the TV minimization process, the reconstruction device 114 performs on the projection data an ordered subsets simultaneous algebraic reconstruction technique (OSSART). The projection data is grouped into a predetermined number of subsets N each having a certain number of views. During the OSSART, each subset may be sequentially processed in one embodiment. In another embodiment, a plurality of the subsets may be processed in parallel by taking advantage of certain microprocessor such as multiple central processing units (CPU) or a graphics processing unit (GPU). In yet another embodiment, the reconstruction device 114 performs on the projection data an ordered subsets simultaneous algebraic reconstruction technique (OSSART) with a relaxation parameter.

During the ordered subsets simultaneous algebraic reconstruction technique (OSSART), the reconstruction device 114 also performs two major operations. Namely, for each subset N, the reconstruction device 114 re-projects the image volume to form the computed projection data and back-projects the normalized difference between the measured projection and the computed projection data to reconstruct an updated image volume when added to the current image estimate. In further detail, one embodiment of the reconstruction device 114 re-projects the image volume by using the ray tracing technique where no coefficient of the system matrix is cached. Moreover, one embodiment of the reconstruction device 114 simultaneously re-projects all rays in a subset, and this is optionally implemented in parallel. Other embodiments include the system model and the noise model. In the back-projection, one embodiment of the reconstruction device 114 uses a pixel-driven technique to back-project all of the normalized difference projection data in a subset to form the desired updated image volume. Because the reconstruction device 114 back-projects all ray sums, i.e., difference projection data, in a subset to form an image volume, this operation is optionally implemented in parallel too. These operations are applied to every subset N to complete a single OSSART step. This and other embodiments are optionally included in the scope of the current invention as more particularly claimed in the appended claims.

In the total variation (TV) minimization process, one embodiment of the discrete TV minimization device 117 employs discrete TV minimization with a predetermined step parameter and step number—for adjusting a given pixel value. The one-direction condition is applied optionally. As will be described with respect to FIG. 6, the predetermined one-direction condition reduces noise in high noise regions while it avoids certain low noise regions from being overcompensated or excessively smoothed. In the discrete TV minimization, if a pixel is on an edge, the pixel value will remain exactly the same before and after denoising. In other words, one embodiment of the discrete TV minimization device 117 substantially reduces blur edges in images. Furthermore, one embodiment of the discrete TV minimization device 117 substantially improves unnatural noise texture in the denoised image especially after strong noise reduction. One embodiment of the discrete TV minimization device 117 terminates discrete TV minimization upon reaching a certain predetermined condition. One exemplary termination condition is the zero gradients due to the one-direction condition while another example is a predetermined number of repetitions of the discrete TV minimization.

In the above described multi-slice X-ray CT apparatus or scanner according to the current invention, one embodiment of the reconstruction device 114 reconstructs an image based upon an iterative reconstruction technique. Another one embodiment of the reconstruction device 114 reconstructs an image based upon an analytical reconstruction technique such as filtered backprojection (FBP). Furthermore, the above described embodiment of the multi-slice X-ray CT apparatus or scanner according to the current invention includes separate devices for the reconstruction device 114 and the discrete TV minimization device 117. In another embodiment, the reconstruction device 114 and the discrete TV minimization device 117 are optionally a single device including a combination of software and hardware. The current invention is practiced to improve noise texture after noise reduction based upon the discrete TV minimization with one-direction condition without limiting to any particular set of hardware or software implementations.

Figure 2:
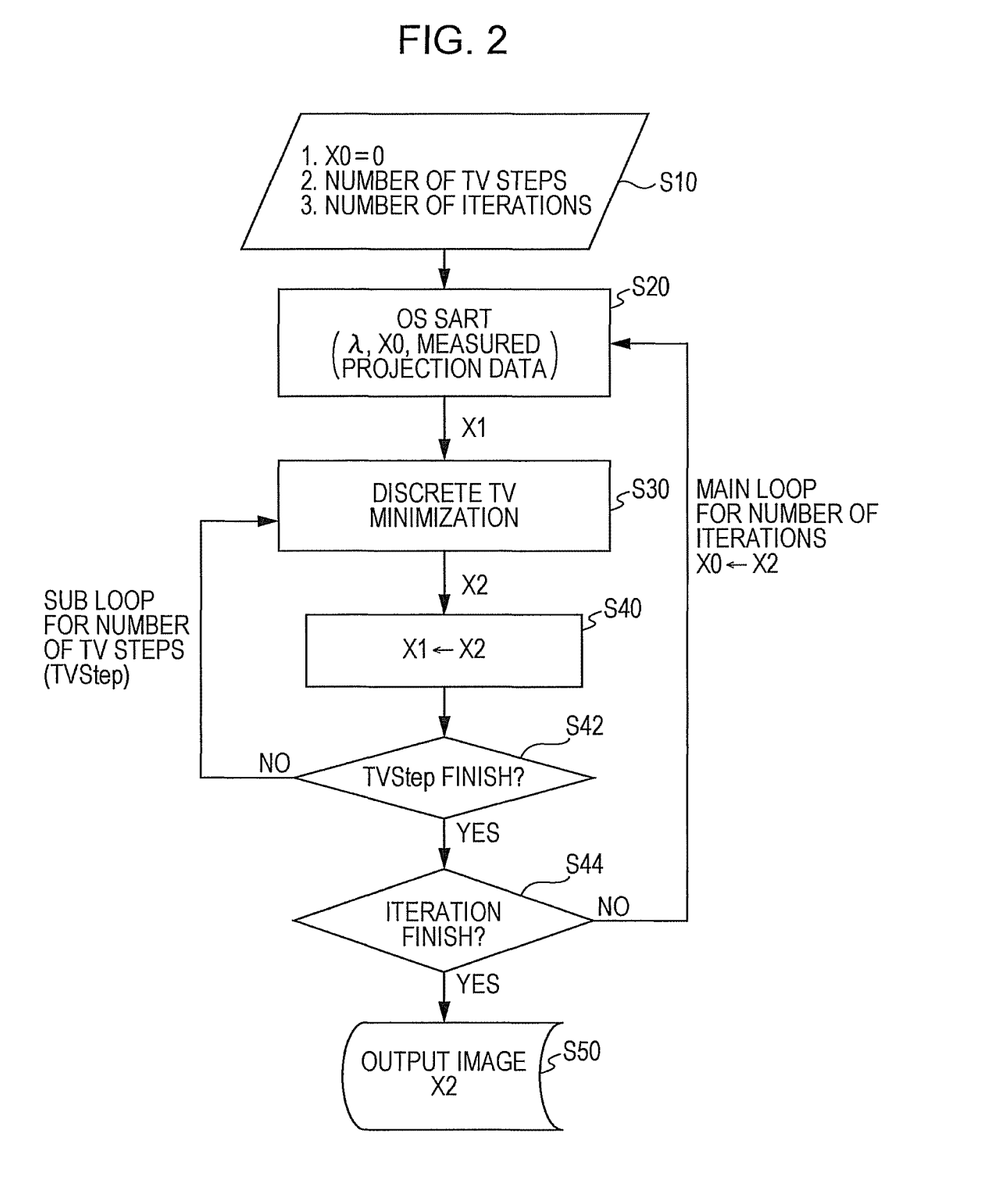
FIG. 2 is a flow chart illustrating steps involved in a preferred process of the Total Variation Iterative Reconstruction (TV-IR) according to the current invention.

Now referring to FIG. 2, a flow chart illustrates steps involved in an exemplary process of total variation iterative reconstruction (TV-IR) according to the current invention. In an initialization step S10, an image X0 is initialized to 0. In the same step, a value indicating a number of iteration is initialized to a first predetermined number K, and a current number of iterations is kept in an iteration counter or a main-loop counter k. In a step S20, an ordered subset simultaneous algebraic reconstruction technique (OSSART) with a relaxation parameter is performed on the measured projection data in an exemplary process of the TV-IR according to the current invention. The step S20 outputs an intermediate image X1. The detailed steps of the OSSART will be further described with respect to FIG. 3 below.

Still referring to FIG. 2, the illustrated exemplary process includes two loops where certain steps are repeated and or iteratively performed. The first loop is the main or outer loop that includes steps S20, S30 and S40. The main loop is repeated according to the first predetermined number K that is assigned to the main-loop counter k in the step S10 according to the exemplary process. As each repetition of the main loop is completed, the main-loop counter k is decremented by one from the initial value K. In one exemplary process, the first predetermined number K is optionally determined based upon a number of ordered subsets $N_{sets}$ of the projection data, which will be further described with respect to FIG. 3. Within the main loop, an ordered subsets simultaneous algebraic reconstruction technique (OSSART) with relaxation parameter lambda is applied to projection data in a step S20. A weight value is stored in a relaxation parameter $\lambda$ for the OSSART.

The second loop is the sub or inner loop that includes the steps S30 and S40. The sub loop is also called a total variation step (TVstep) loop. The sub loop is repeated according to a second predetermined number S that is also assigned to a total variation counter or a sub-loop counter s in one embodiment. The steps S30 and S40 are repeated in the sub loop for the assigned second number of times S in the one embodiment. As each repetition of the sub loop is completed, the sub-loop counter s is decremented by one from the initial value S. In another embodiment, the steps S30 and S40 are repeated in the sub loop are repeated until a predetermined condition is reached.

In the step S30, a discrete total variation minimization technique is iteratively performed in order to minimize the total variation based upon a predetermined technique. As the step S30 is finished, an image X2 is generated from the intermediate image X1 from the step S20. The image generated in the step S30 is assigned to an intermediate image holder or variable X1 in the step S40.

In a step S42, it is decided based upon the sub-loop counter s or a predetermined termination condition as to whether or not the sub loop is completed. If it is decided that the sub loop is completed in the step S42, it is further determined in a S44 as to whether or not the steps S20 through S40 are to be repeated in the main loop. On the other hand, if it is decided in the step S42 that the sub loop is not yet completed, the steps S30 and S40 are repeated in the sub loop.

In the step S44, it is decided based upon the main loop counter k as to whether not the main loop is completed. If it is decided that the main loop is completed in the step S44, the image X2 is outputted in a step S50. On the other hand, if it is decided in the step S44 that the main loop is not yet completed, the steps S20, S30 and S40 are repeated in the main loop.

Figure 3:
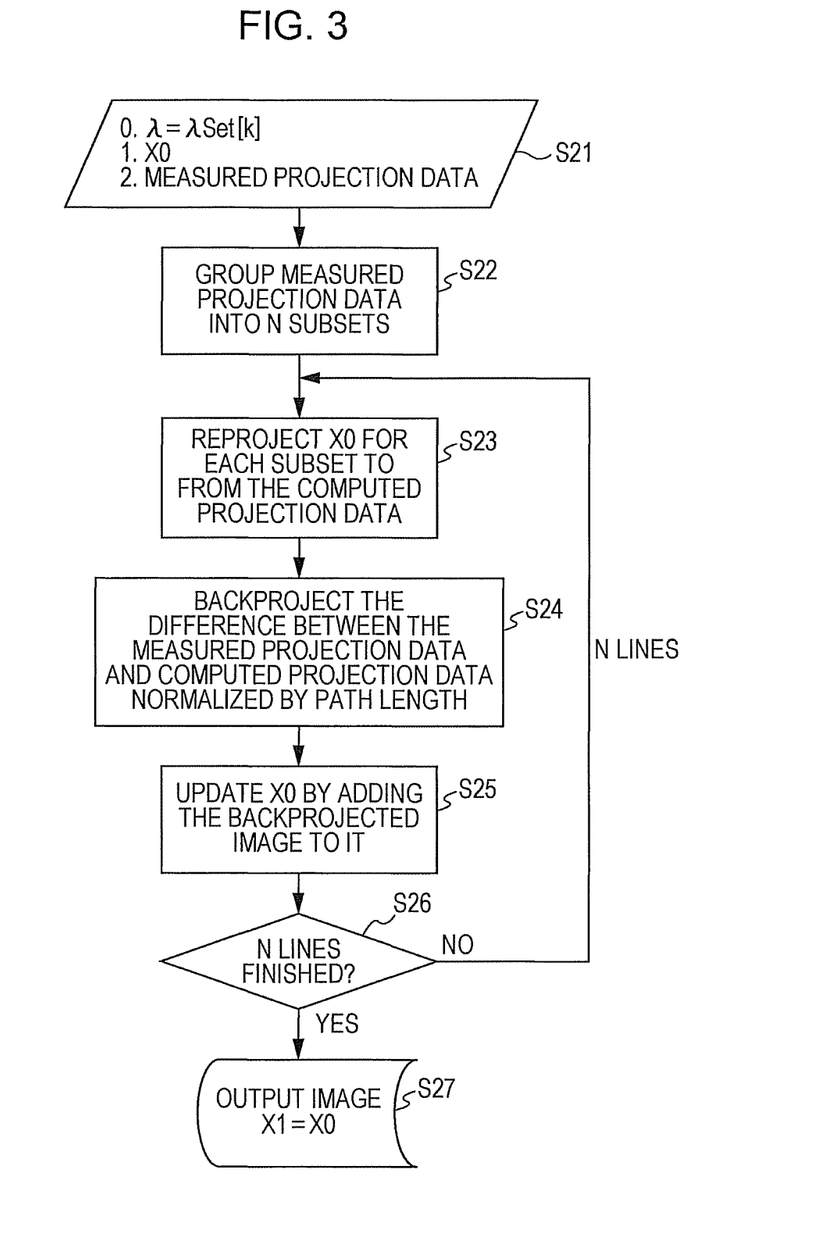
FIG. 3 is a flow chart illustrating steps involved in the ordered subset simultaneous algebraic reconstruction technique (OSSART) as used in a preferred process of the Total Variation Iterative Reconstruction (TV-IR) according to the current invention.

Now referring to FIG. 3, a flow chart illustrates further acts or sub steps in the step S20 of FIG. 2, and these steps are involved in the ordered subset simultaneous algebraic reconstruction technique (OSSART) with a relaxation parameter as used in an exemplary process of the total variation iterative reconstruction (TV-IR) according to the current invention. The illustrated process of the OSSART includes one loop where certain steps are repeated and iteratively performed. The loop includes steps S23, S24 and S25 and is repeated according to a predetermined number $N_{sets}$ rather than a certain condition is met. When the loop is finished, the OSSART outputs the intermediate image in the variable X1 in a step S27.

Still referring to FIG. 3, each of the steps S21 through S26 will be generally described below. In a step S21, the image X0 and measured projection data p are available from through the step S20 of FIG. 2. In one optional implementation, one of the stored weight values in the first predetermined record structure is selected based on an index k that corresponds to a value of the main-loop counter k of the main loop and is assigned to the relaxation parameter $\lambda$.

In a step S22, the measured projection data p is partitioned into $N_{sets}$ groups called subsets. The number of subsets $N_{sets}$ is based upon a certain rule that the total number of views is divided by a predetermined number of subviews. For example, if the projection data have 1200 views in total and a predetermined number of subviews is 15, a number of subsets is 80 (1200/15=80). Alternatively, the number of views in each subset optionally changes. For a fixed number of total views, if a number of subsets is relatively small due to a large number of subviews, the image will converge slowly and requires more iterations in the main loop. On the other hand, if a number of subsets is relatively large due to a small number of subviews, the image will converge fast and requires less iterations. At the same time, the image includes more noise. Based upon the above relationship, a value of the first predetermined number K is optionally modified in the step S10 of FIG. 2.

Each of the subsets $N_{sets}$ contains a number of subrays $N_{subrays}$, which is determined by dividing a total number of arrays $N_{rays}$ by the subsets $N_{sets}$. For each of the subsets $N_{sets}$, a step S23 re-projects the image X0 to form the computed projection data while a step S24 back-projects the normalized difference between the measured projection data and the computed projection data. In further detail, one exemplary process of the step S23 re-projects the image volume by using the ray tracing technique where no coefficient of the system matrix is cached. Moreover, one embodiment of the step S23 simultaneously re-projects all rays in a subset, and this is optionally implemented in parallel. In the back-projection, one embodiment of the S24 uses a pixel-driven technique to back-project all of the normalized difference projection data in a subset to form the desired updated image volume. Because the step S24 back-projects all ray sums, i.e., the normalized difference projection data, in a subset to form an image volume, this operation is optionally implemented in parallel. These operations are applied to every subset $N_{sets}$ to complete a single OSSART step. After a subset counter is initialized to $N_{sets}$, the subset counter is decremented by one as each operation is completed.

Still referring to FIG. 3, a step S25 updates the image X0 by adding the weighted back-projected image from the step S24 to the image X0. To weight the back-projected image, the relaxation parameter $\lambda$ is used as will be further described with respect to FIG. 6. Consequently, it is determined in a step S26 as to whether or not the $N_{sets}$ have been already completed. If it is determined based upon the step S26 that the $N_{sets}$ have not already completed, the loop is repeated by proceeding to the step S23. On the other hand, if it is determined in the step S26 that the $N_{sets}$ have already completed, the image generated in the step S25 is assigned to an intermediate image holder or variable X1 before the image X1 is outputted in a step S27.

Figure 4:
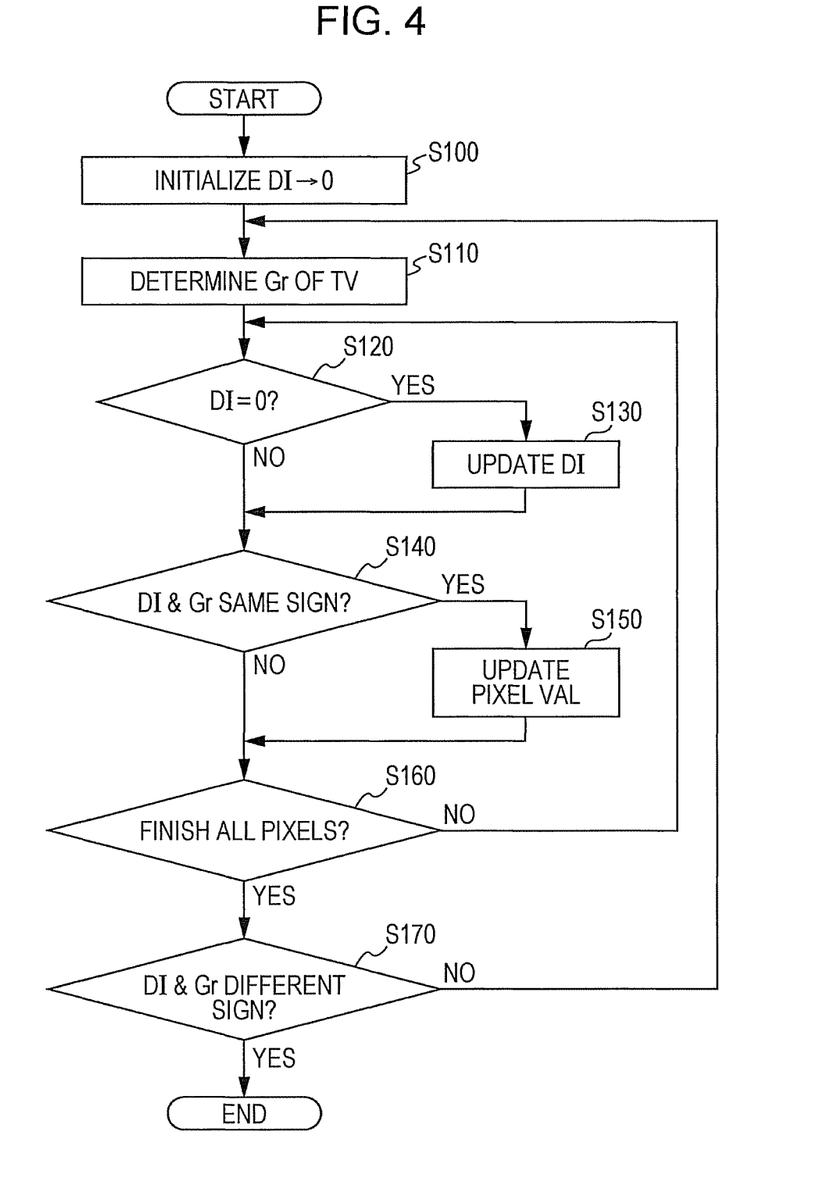
FIG. 4 is a flow chart illustrating steps involved in the discrete TV minimization technique as used in a preferred process of the Total Variation Iterative Reconstruction (TV-IR) according to the current invention.

Now referring to FIG. 4, a flow chart illustrates further steps of the step S30 in FIG. 2, and these steps include the discrete total variation (TV) minimization technique as used in a process of the total variation iterative reconstruction (TV-IR) according to the current invention. The illustrated process of the discrete TV minimization technique includes the sub loop where certain steps are repeated and iteratively performed. The sub loop includes steps S110 through S160 and is repeated for a predetermined number of times and or until a certain condition is met. When the sub loop is finished, the discrete TV minimization technique returns the image in the variable X2.

Still referring to FIG. 4, each of the steps S100 through S170 will be generally described below. In a step S100, a direction index DI is initialized to a predetermined value such as 0 for each pixel. The predetermined value 0 in this case signifies unknown in directional change for the total variation for a given pixel. By the same token, a predetermined value 1 signifies an increase in directional change for the total variation for a given pixel while a predetermined value −1 signifies a decrease in directional change for the total variation for a given pixel. In a step S110, a gradient Gr of total variation (TV) is determined for a given pixel i and the corresponding value is stored in GR[i]. The sign of the gradient GR of total variation indicates an increase by +1, a decrease by −1 or an unknown by 0 for a given pixel i. For the corresponding pixel i, it is determined in a step S120 as to whether or not the direction index DI[i] is 0 or unknown as initialized. If it is determined in the step S120 that the direction index DI[i] is 0 or unknown, the direction index DI[i] is updated to the corresponding sign of the gradient GR[i] in a step S130. That is, if the gradient GR of total variation is larger than zero, an increase value +1 is assigned to the direction index DI[i]. Similarly, if the gradient GR of total variation is less than zero, a decrease value −1 is assigned to the direction index DI[i]. Lastly, if the gradient GR of total variation is zero, an unknown value 0 is assigned to the direction index DI[i]. Following the step S130, the exemplary process of the discretion total variation minimization proceeds to a step S140. On the other hand, if it is determined in the step S120 that the direction index DI[i] is not 0 or unknown, the direction index DI[i] is not updated in the step S130 and the exemplary process of the discretion total variation minimization proceeds to a step S140.

Still referring to FIG. 4, the exemplary process of the discretion total variation minimization further determines in the step S140 as to whether or not the direction index DI[i] and the gradient Gr[i] have the same sign for a given pixel i. If it is determined in the step S140 that the direction index DI[i] and the gradient Gr[i] have the same sign, the pixel value for the given pixel i is updated with a predetermined constant in a step S150. An exemplary value of the predetermined constant is an estimated standard deviation StdD in the original image divided by N, where N ranges from 10 to 100. Following the step S150, the exemplary process of the discretion total variation minimization proceeds to a step S160. On the other hand, if it is determined in the step S140 that the direction index DI[i] and the gradient Gr[i] do not have the same sign, the pixel value i is not updated in the step S150 and the exemplary process of the discretion total variation minimization proceeds to the step S160.

The discretion total variation minimization is terminated according to a predetermined rule. In the step S160, it is determined as to whether or not all of the pixels in the image have been processed. If it is determined that all of the pixels in the image have not yet been processed, the exemplary process of the discretion total variation minimization proceeds back to the step 110 for the remaining and unprocessed pixels. On the other hand, if it is determined that all of the pixels in the image have been already processed, the exemplary process of the discretion total variation minimization proceeds to a step S170, where an additional termination condition is examined. In one embodiment of the discretion total variation minimization process, one predetermined termination condition is that the direction index DI[i] and the gradient Gr[i] have a different sign in every pixel as illustrated in a step S170. If it is determined in the step S170 that any of the pixels in the image fail to have a different sign in the direction index DI[i] and the gradient Gr[i], the exemplary process of the discretion total variation minimization proceeds back to the step S110 for additional processing. On the other hand, if it is determined in the step S170 that all of the pixels in the direction index DI[i] and the gradient Gr[i] have a different sign, the exemplary process of the discretion total variation minimization terminates.

In an alternative embodiment of the discretion total variation minimization process, the termination condition in the step S170 is achieved by reaching a predetermined number of repetitions of the steps S110 through S160 in lieu of the different sign in the direction index DI[i] and the gradient Gr[i] of every pixel. If it is determined in the step S170 that a predetermined number of repetitions is not yet achieved, the exemplary process of the discretion total variation minimization proceeds back to the step S110 for additional processing. One exemplary predetermined number of iterations N is defined by an estimated standard deviation StdD in the original image divided by a constant C, where the constant C is the estimated standard deviation in the denoised image. On the other hand, if it is determined in the step S170 that a predetermined number of repetitions is achieved, the exemplary process of the discretion total variation minimization terminates. The above described exemplary and alternative embodiments are not limiting the discrete total variation process according to the current invention.

Figure 5A:
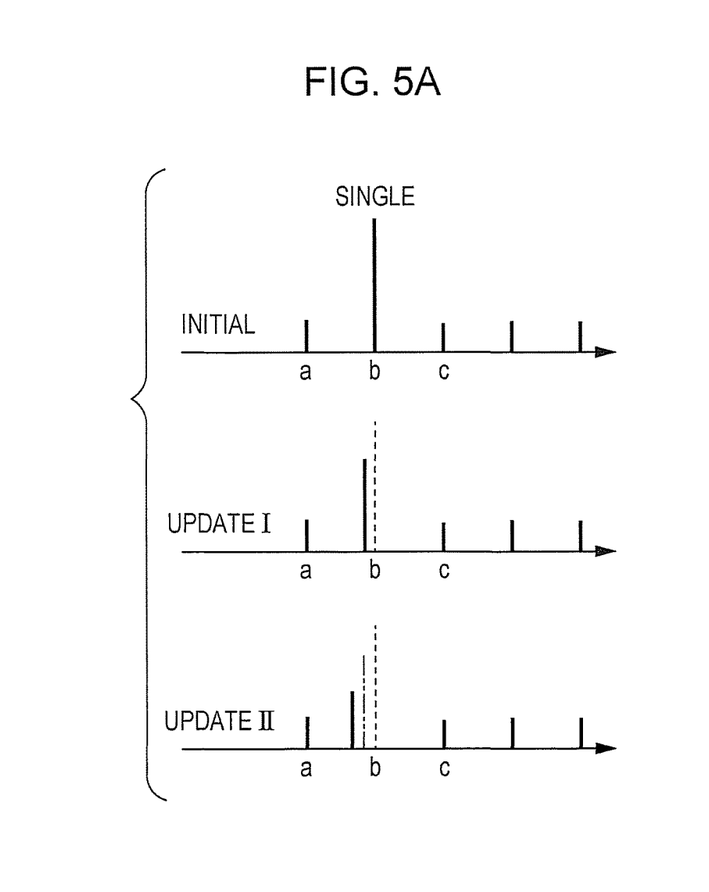
FIG. 5A illustrates a single odd pixel case to be processed in a conventional process of total variation minimization according to prior art.

FIG. 5A illustrates a single odd pixel case to be processed in a conventional process of total variation minimization according to prior art. A top diagram illustrates a single pixel b with respect to neighboring pixels a and c, and the value of the single pixel b is assumed to be exceedingly higher from its true value in the initial state. After a first update in the discrete total variation minimization, the value of the single pixel b is now reduced as illustrated in Update I by a solid line with respect to the original value in a dotted line. After a second update in the discrete total variation minimization, the value of the single pixel b is further reduced as illustrated in Update II by a solid line with respect to the original value in a dotted line and the first updated value in a double dotted line.

Figure 5B:
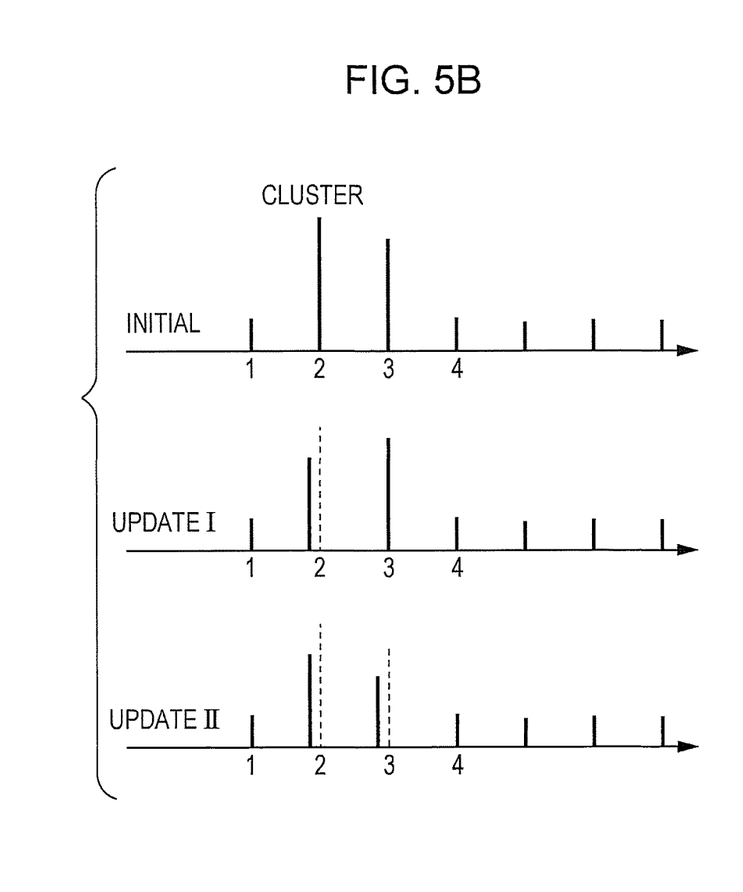
FIG. 5B illustrates an odd pixel cluster case to be processed in a process of total variation minimization according to prior art.

FIG. 5B illustrates an odd pixel cluster case to be processed in a process of the discrete total variation minimization according. A top diagram illustrates a pixels 2 and 3 with respect to neighboring pixels 1 and 4, and the values of the pixels 2 and 3 are assumed to be exceedingly higher from its true value in the initial state. After a first update in the discrete total variation minimization, the value of the single pixel 2 is now reduced as illustrated in Update I by a solid line with respect to the original value in a dotted line. After a second update in the discrete total variation minimization, the value of the single pixel 3 is now reduced as illustrated in Update II by a solid line with respect to the original value in a dotted line. As seen in FIGS. 5A and 5B, since only one pixel value is updated, in case of cluster of pixels to be adjusted, it takes longer to process a cluster. That is, odd cluster coverage is generally slower than single pixel coverage.

Figure 6:
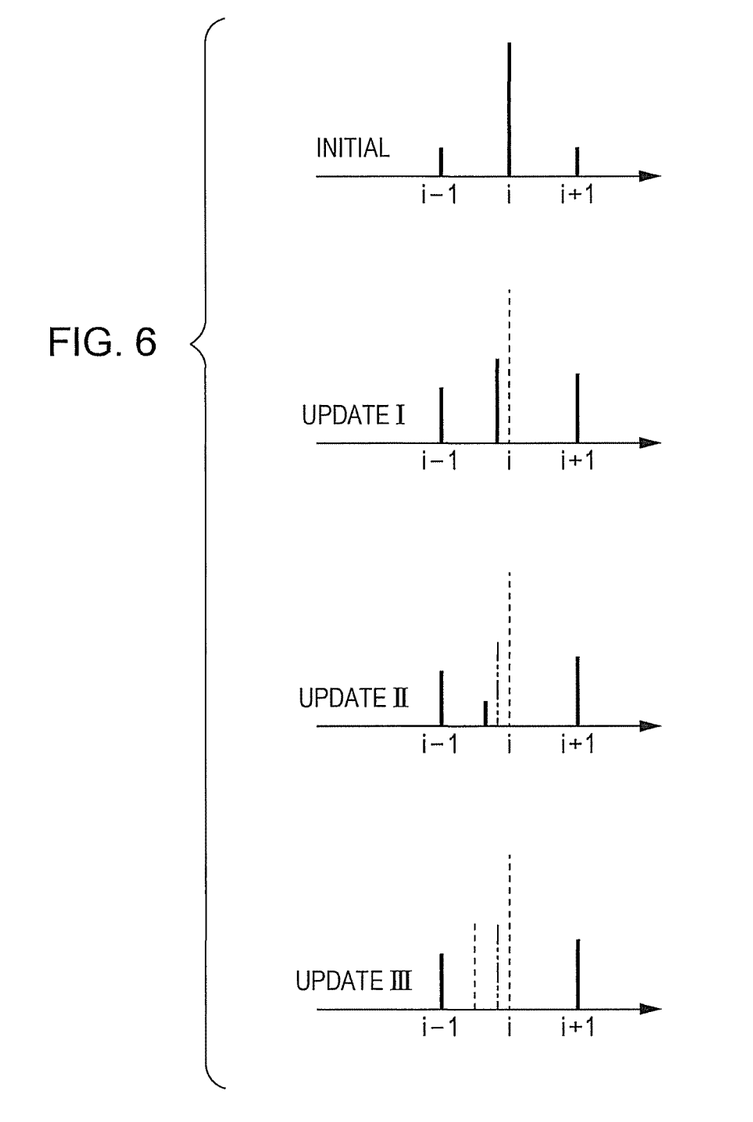
FIG. 6 illustrates an exemplary pixel case to be processed by the discrete TV minimization technique as used in a preferred process of the Total Variation Iterative Reconstruction (TV-IR) according to the current invention.

FIG. 6 illustrates an exemplary pixel case to be processed by the discrete TV minimization technique with a one-direction condition as used in an exemplary process of the Total Variation Iterative Reconstruction (TV-IR) according to the current invention. In general, a pixel value increases or decreases as determined by the gradient at each step. The one-direction condition is that each pixel value only increases or decreases according to a non-zero gradient value as decided in the first step. In other words, the directional change remains the same during the discrete total variation minimization and cannot be subsequently changed in the one-direction condition according to the current invention.

Still referring to FIG. 6, a top diagram illustrates a single pixel i with respect to neighboring pixels i−1 and i+1, and the value of the single pixel i is assumed to be exceedingly higher from its true value in the initial state. That is, the pixel i should be decreased, and the direction index is set to indicate a decrease in the first total variation minimization step. After a first total variation minimization step, the value of the single pixel i is now reduced as illustrated in Update I by a solid line with respect to the original value in a dotted line. After a second total variation minimization step, the value of the single pixel i is further reduced as illustrated in Update II by a solid line with respect to the original value in a dotted line and the first updated value in a double dotted line. After a third total variation minimization step, the one-direction condition prevents the value of the single pixel i from increasing as illustrated in Update III by a dotted line with respect to the first updated value in a double dotted line. In other words, after the third update III, the value of the single pixel i remains as illustrated in Update II by a solid line with respect to the original value in a dotted line and the first updated value in a double dotted line.

FIGS. 7A through 7D illustrate that the discrete TV minimization technique processes various exemplary cases in one embodiment of the Total Variation Iterative Reconstruction (TV-IR) process according to the current invention. In general, the discrete total variation in 1-dimensional discrete distribution is defined by Equation (1).

$$TV = \sum_i |f_{i+1} - f_i| \tag{1}$$

The total variation minimization is defined by Equation (2).

$$f_i^{(n)} = f_i^{(n-1)} - a \frac{\partial TV}{\partial f_i} \tag{2}$$

Where n is 1, 2, 3 . . . and a is a constant. The discrete gradient of total variation is substantially synonymous with the gradient of discrete total variation and is defined by Equations (3) and (4) in the current application.

$$\frac{\partial TV}{\partial f_{i'}} = \sum_i \frac{\partial}{\partial f_{i'}} |f_{i+1} - f_i| \tag{3}$$

$$= \text{sgn}(f_{i'} - f_{i'-1}) - \text{sgn}(f_{i'+1} - f_{i'}) \tag{4}$$

For one dimension, the value of Equation (4) is either one of −2, 0 and +2.

By the same token, the gradient direction for a 3D image f(i, j, k) is determined by a function gtv along a predetermined direction as seen in Equation (5).

$$gtv(i,j,k) = \text{sgn}(f(i-1,j,k) - f(i,j,k)) + \text{sgn}(f(i+1,j,k) - f(i,j,k)) + \text{sgn}(f(i,j-1,k) - f(i,j,k)) + \text{sgn}(f(i,j+1,k) - f(i,j,k)) \tag{5}$$

For two dimension, the value of Equation (5) is either one of −4, −2, 0, +2 and +4 as index k is an image slice index. Similarly, the 3D TV gradient for a 3D image f(i, j, k) at a predetermined point is either one of −6, −4, −2, 0, +2, +4 and +6.

Furthermore, an integer in is determined to eliminate a dot at (i, j, k) and the m is defined by Equation (6).

$$m = \left\lfloor \frac{1}{a} \min(|f(i-1, j, k) - f(i, j, k)|, |f(i+1, j, k) - f(i, j, k)|) \right\rfloor \tag{6}$$

where a is the predetermined value and the m is larger than a predetermined threshold $m_0$, a point of f(i, j, k) is an isolated noise dot. The isolated noise dot is eliminated by f(i, j, k)=f(i, j, k)+ma/2gtv(i, j, k). Similarly, a dot value m is determined to eliminate a dot at (i, j, k) and the m is defined by Equation (7).

$$m = \frac{1}{a} \min(|f(i-1, j, k) - f(i, j, k)|, |f(i+1, j, k) - f(i, j, k)|, \\ |f(i, j-1, k) - f(i, j, k)|, |f(i, j+1, k) - f(i, j, k)|), \tag{7}$$

where a is the predetermined value and m is larger than a predetermined threshold $m_0$, a point of f(i, j, k) is an isolated noise dot. The isolated noise dot is eliminated by f(i, j, k)=f(i, j, k)+ma/4gtv(i, j, k). Similarly, Eqs. (5) and (7) can be generalized to a pre-determined volume for a 3D image f(I,j,k).

Figure 7A:
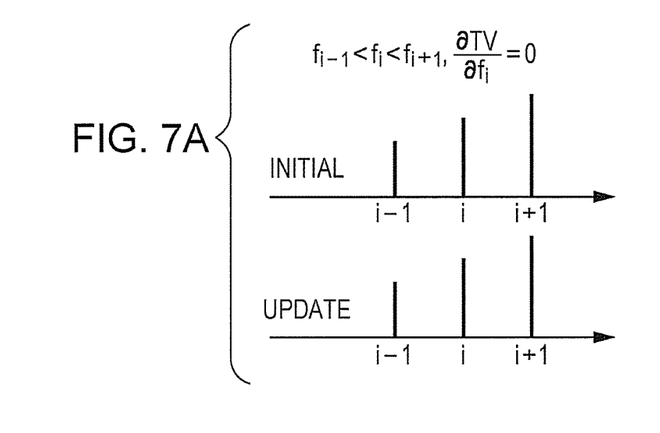
FIGS. 7A through 7D illustrate various exemplary cases to be processed by the discrete TV minimization technique as used in a preferred process of the Total Variation Iterative Reconstruction (TV-IR) according to the current invention.

Now referring to FIG. 7A, a first signal preservation pattern is illustrated for an exemplary set of pixel values in the discrete total variation minimization. In an initial state of the pixel values, the three pixel values increase from a first pixel i−1 to a second pixel i and from the second pixel i to a third pixel i+1 as illustrated in a top diagram of FIG. 7A. That is, Equations (8) respectively show that the pixel values are increasing while the gradient is zero.

$$f_{i-1} < f_i < f_{i+1}, \frac{\partial TV}{\partial f_i} = 0 \tag{8}$$

Consequently, after the discrete total variation minimization, the updated pixel values in the second pixel i remain the same as illustrated in an update bottom diagram of FIG. 7A. In the conventional TV minimization, the TV gradient values for the pattern in FIG. 7A are usually not zero because of the continuous image model. The pixel values will be updated with a non-zero value and the pattern will be changed, which may result in edge blurring.

Figure 7B:
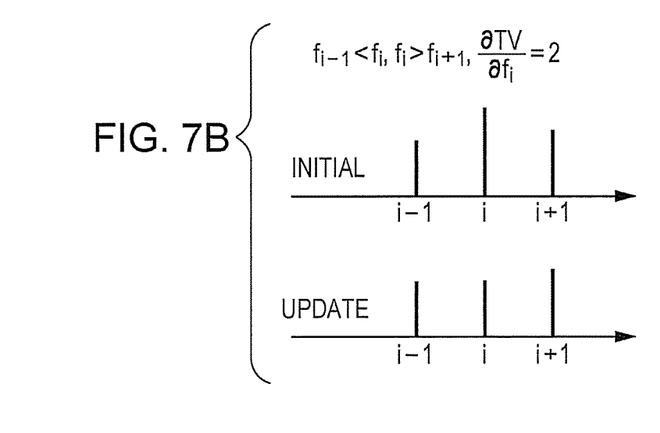

Now referring to FIG. 7B, a second signal preservation pattern is illustrated for an exemplary set of pixel values in the total variation minimization. In an initial state of the pixel values, the pixel value increases from a first pixel i−1 to a second pixel i, but the pixel value decreases from the second pixel i to a third pixel i+1 as illustrated in a top diagram of FIG. 7B. That is, Equations (9) respectively show that the pixel values are increasing and then decreasing while the gradient is two according to Eq. (4).

$$f_{i-1} < f_i, f_i > f_{i+1}, \frac{\partial TV}{\partial f_i} = 2 \tag{9}$$

Consequently, the second pixel i decreases its value after the discrete total variation minimization as illustrated in an update bottom diagram of FIG. 7B.

Figure 7C:
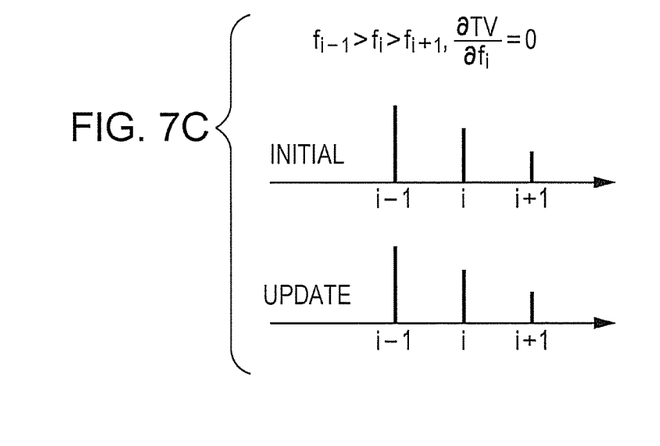

Now referring to FIG. 7C, a third signal preservation pattern is illustrated for an exemplary set of pixel values in the total variation minimization. In an initial state of the pixel values, the three pixel values decrease from a first pixel i−1 to a second pixel i and from the second pixel i to a third pixel i+1 as illustrated in a top diagram of FIG. 7C. That is, Equations (10) respectively show that the pixel values are decreasing while the gradient is zero.

$$f_{i-1} > f_i > f_{i+1}, \frac{\partial TV}{\partial f_i} = 0 \tag{10}$$

Consequently, after the discrete total variation minimization, the updated pixel values in the second pixel i remain the same as illustrated in an update bottom diagram of FIG. 7C.

Figure 7D:
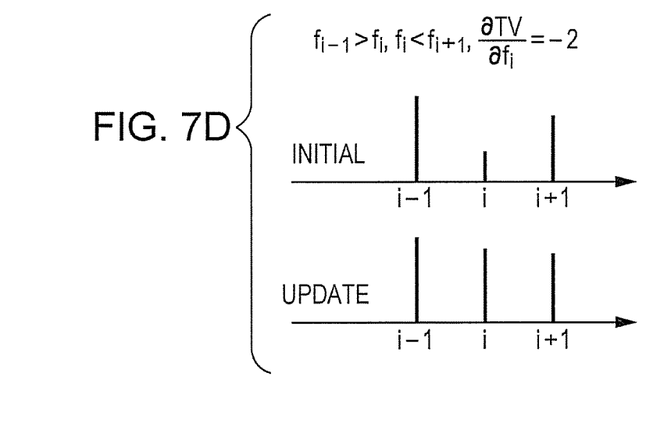

Now referring to FIG. 7D, a fourth signal preservation pattern is illustrated for an exemplary set of pixel values in the total variation minimization. In an initial state of the pixel values, the pixel value decreases from a first pixel i−1 to a second pixel i, but the pixel value increases from the second pixel i to a third pixel i+1 as illustrated in a top diagram of FIG. 7D. That is, Equations (11) respectively show that the pixel values are decreasing and then increasing while the gradient is minus two.

$$f_{i-1} > f_i, f_i < f_{i+1}, \frac{\partial TV}{\partial f_i} = -2 \qquad (11)$$

Consequently, the second pixel i increases its value after the discrete total variation minimization as illustrated in an update bottom diagram of FIG. 7D.

Figure 8A:
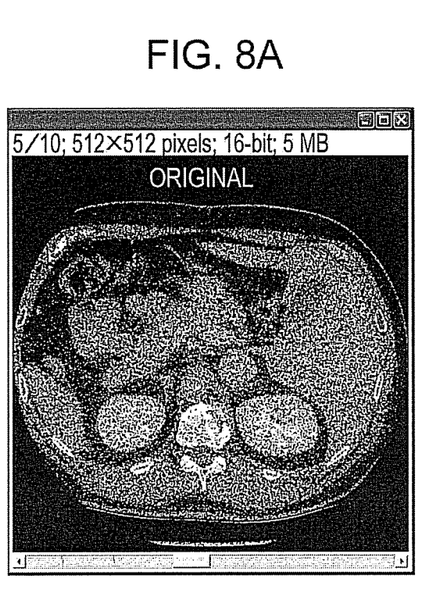
FIG. 8A illustrates an image that has been reconstructed from projection data and has a high level of noise that is distributed in a non-uniform manner in the image.

FIG. 8A illustrates an image that has been reconstructed from projection data and has a high level of noise that is distributed in a non-uniform manner in the image.

Figures 8A, 8B, 8C:
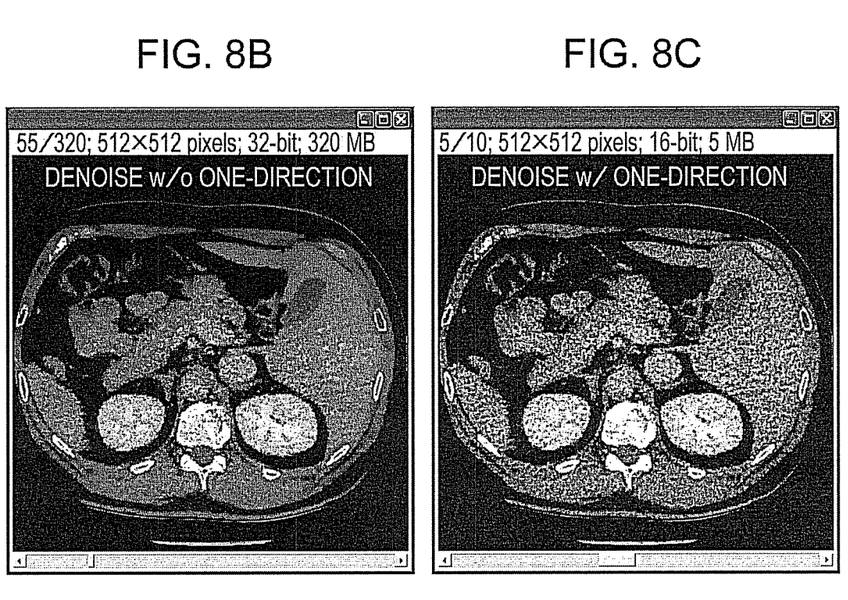
FIG. 8B illustrates an image that has been reconstructed using the total variation iterative reconstruction (TV-IR).
FIG. 8C illustrates an exemplary image that has been reconstructed using the total variation iterative reconstruction (TV-IR) with the one-direction condition according to the current invention.

FIG. 8B illustrates an image that has been denoised from FIG. 8A using the discrete total variation minimization. The total variation minimization has been utilized without the above described one-direction condition according to the current invention. Consequently, although the image shows that the total variation minimization has reduced the noise to some extent, some regions of the image appear overcompensated or excessively smoothed after denoising. These excessively smoothed regions initially had a relatively low level of noise.

FIG. 8C illustrates an exemplary image that has been denoised from FIG. 8A using the discrete total variation minimization with the one-direction condition according to the current invention. The discrete total variation minimization has been utilized with the above described one-direction condition according to the current invention. Consequently, the reconstructed image shows that the discrete total variation minimization has substantially reduced the noise without overcompensating or excessively smoothing the regions initially containing a relatively low level of noise.

Figure 9A:
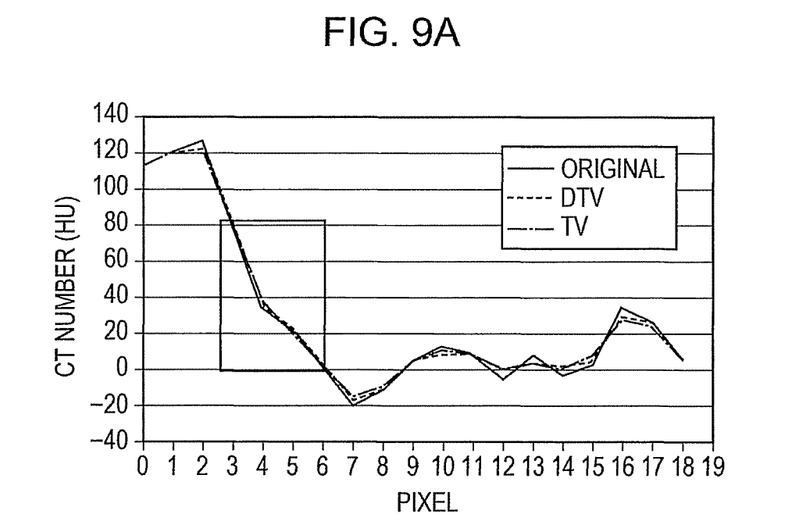
FIG. 9A is a graph illustrating a series of pixels across an edge and their pixel values in CT numbers in the original image, after the discrete total variation (DTV) minimization and after the total variation (TV) minimization.
Figure 9B:
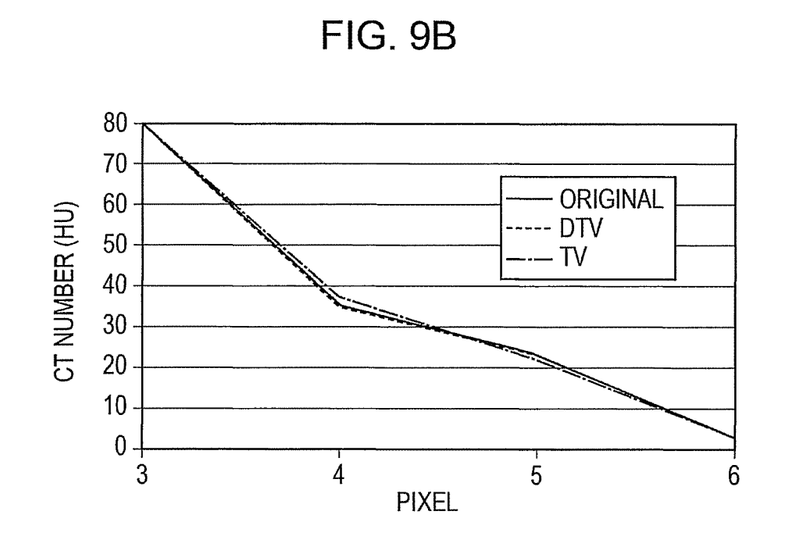
FIG. 9B is a plot illustrating an enlarged edge portion of the pixels in the blue rectangular box in FIG. 9A.

Now referring to FIG. 9A, a graph illustrates a series of pixels across an edge and their pixel values in CT numbers in the original image as indicated by a solid line, after the discrete total variation (DTV) minimization as indicated by a dotted line and after the total variation (TV) minimization as indicated by a point-dot line. A portion of the pixels that are on an edge is indicated by a blue rectangular box in FIG. 9A. FIG. 9B is a plot illustrating an enlarged edge portion of the pixels in the blue rectangular box in FIG. 9A. The enlarged portion of the pixel values is substantially equal between the original image and after the discrete total variation (DTV) minimization as indicated by a single dotted line. On the other hand, the enlarged portion of the pixel values are slightly different from those after the total variation (TV) minimization as indicated by a single point-dot line.

As will be claimed, the inventive concept of the current invention includes potentially independent methods and systems that do not necessarily require a combination of features including the discrete gradients of total variation (DTV) minimization and the one-direction condition with respect to a particular reconstruction algorithm. For example, the technique of applying the discrete gradient of total variation (DTV) minimization alone without the one-direction condition is utilized with either a predetermined iterative reconstruction algorithm or a predetermined analytical reconstruction algorithm. By the same token, the technique of applying the one-direction condition alone without the discrete gradient of total variation (DTV) minimization is utilized with either a predetermined iterative reconstruction algorithm or a predetermine analytical reconstruction algorithm. Furthermore, the technique of the one-direction condition alone is combined with either a discrete total variation (DTV) minimization technique or a conventional total variation (TV) minimization technique. These examples are merely illustrative and are not limiting the inventive concept of denoising the images according to the current invention.

In general, the above features have some distinguishable effects on the image according to the current invention. For example, the one-direction condition improves noise uniformity in the denoised images and avoids over smoothing in the low noise regions in an image, assuming that the image originally has an unequal noise distribution. On the other hand, the DTV minimization results in an improved edge preserving effects in comparison to the conventional TV minimization. Using DTV, the pixel values on an edge will not be substantially affected after a certain denoising treatment. The difference between the DTV minimization and the conventional TV minimization is substantially negligible for strong edges while the DTV minimization substantially improves in preserving the weak edges. Another distinction is that DTV keeps the original values while TV slightly smoothes the values for the pixel near the bottom and top of edges.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of denoising an image, a set of predetermined values respectively indicating an increase, a decrease and unknown in gradient direction of total variation at a given pixel, comprising the steps of:
   a) initializing a direction index to the unknown for each of image pixels;
   b) determining a discrete gradient of the total variation for each of the image pixels, the discrete gradient indicating the increase, the decrease or the unknown;
   c) updating the direction index of each of the image pixels with the discrete gradient if the direction index is the unknown;
   d) changing a pixel value of each of the image pixels by a predetermined value to reduce the total variation if the direction index and the discrete gradient are equal in the gradient direction for the one of the image pixels; and
   e) repeating the steps b) through d) until a certain predetermined condition is reached.

2. The method of denoising an image according to claim 1 wherein the certain predetermined condition is that the direction index and the discrete gradient are different in the gradient direction for each of the image pixels.

3. The method of denoising an image according to claim 1 wherein the certain predetermined condition is a predetermined number of repetitions of the steps b) through d).

4. The method of denoising an image according to claim 1 wherein the gradient direction for a 2D image f(i, j, k) in a predetermined direction is determined by a function gtv:

$$gtv(i,j,k)=\text{sgn}(f(i-1,j,k)-f(i,j,k))+\text{sgn}(f(i+1,j,k)-f(i,j,k))+\text{sgn}(f(i,j-1,k)-f(i,j,k))+\text{sgn}(f(i,j+1,k)-f(i,j,k)).$$

5. The method of denoising an image according to claim 4 wherein a point of f(i, j, k) is an isolated noise dot when a dot value m is larger than a predetermined threshold $m_0$.

6. The method of denoising an image according to claim 5 wherein the dot value m is determined to eliminate the dot at (i, j, k) and the m is defined by:

$$m = \frac{1}{a}\min(|f(i-1, j, k) - f(i, j, k)|, |f(i+1, j, k) - f(i, j, k)|),$$

where a is the predetermined value.

7. The method of denoising an image according to claim 6 wherein the isolated noise dot is eliminated by f(i, j, k)=f(i, j, k)+ma/2gtv(i, j, k).

8. The method of denoising an image according to claim 5 wherein the dot value m is determined to eliminate the dot at (i, j, k) and the m is defined by:

$$m = \frac{1}{a}\min(|f(i-1, j, k) - f(i, j, k)|, |f(i+1, j, k) - f(i, j, k)|,$$
$$|f(i, j-1, k) - f(i, j, k)|, |f(i, j+1, k) - f(i, j, k)|),$$

where a is the predetermined value.

9. The method of denoising an image according to claim 8 wherein the isolated noise dot is eliminated by f(i, j, k)=f(i, j, k)+ma/4gtv(i, j, k).

10. The method of denoising an image according to claim 1 wherein the steps a) through e) are performed in an iterative reconstruction technique.

11. The method of denoising an image according to claim 1 wherein the steps a) through e) are performed in an analytic reconstruction technique.

12. The method of denoising an image according to claim 1 further comprising the steps of:
f) obtaining an image estimate from the measured data;
g) forward projecting the image estimate using at least a single ray to generate reprojected data;
h) determining a difference between the reprojected data and the measured data;
i) updating the image estimate based upon the difference to generate an updated image, wherein the steps f) through i) are performed prior to the step a); and
j) repeating the steps g) through i) using the updated image as the image estimate in the step g) and the steps a) through e).

13. The method of denoising an image according to claim 1 further comprising the steps of:
f) obtaining an image estimate from the measured data;
g) forward projecting the image estimate using at least a single ray to generate reprojected data;
h) determining a data difference between the reprojected data and the measured data;
i) backprojecting the data difference to generate a difference image;
j) performing the steps a) through e) on the difference image;
k) updating the image estimate based upon the difference image to generate an updated image, wherein the steps f) through j) are performed prior to the step a); and
l) repeating the steps g) through j) using the updated image as the image estimate in the step g) and the steps a) through e).

14. A system for denoising an image, comprising:
a reconstruction device for reconstructing an image having image pixels from projection data; and
a discrete Total Variation (TV) minimization unit for setting a set of predetermined values respectively indicating an increase, a decrease and unknown in gradient direction of total variation at a given pixel, said discrete TV minimization unit initializing a direction index to the unknown for each of image pixels, said discrete TV minimization unit determining a discrete gradient of the total variation for each of the image pixels, the discrete gradient indicating the increase, the decrease or the unknown, said discrete TV minimization unit updating the direction index of each of the image pixels with the discrete gradient if the direction index is the unknown, said discrete TV minimization unit changing a pixel value of each of the image pixels by a predetermined value to reduce the total variation if the direction index and the discrete gradient are equal in the gradient direction for the one of the image pixels, said discrete TV minimization unit repeating until a certain predetermined condition is reached.

15. The system for denoising an image according to claim 14 wherein the certain predetermined condition is that the direction index and the discrete gradient are different in the gradient direction for each of the image pixels.

16. The system for denoising an image according to claim 14 wherein the certain predetermined condition is that said discrete TV minimization unit completes a predetermined number of the repetitions.

17. The system for denoising an image according to claim 14 wherein the gradient direction for a 3D image f(i, j, k) in a predetermined direction is determined by a function gtv:

$$gtv(i,j,k)=\text{sgn}(f(i-1,j,k)-f(i,j,k))+\text{sgn}(f(i+1,j,k)-f(i,j,k))+\text{sgn}(f(i,j-1,k)-f(i,j,k))+\text{sgn}(f(i,j+1,k)-f(i,j,k)).$$

18. The system for denoising an image according to claim 17 wherein a point of f(i, j, k) is an isolated noise dot when a dot value m is larger than a predetermined threshold $m_0$.

19. The system for denoising an image according to claim 18 wherein the dot value m is determined to eliminate a dot at (i, j, k) and the dot value m is defined by:

$$m = \frac{1}{a}\min(|f(i-1, j, k) - f(i, j, k)|, |f(i+1, j, k) - f(i, j, k)|),$$

where a is the predetermined value.

20. The system for denoising an image according to claim 19 wherein the isolated noise dot is eliminated by f(i, j, k)=f(i, j, k)+ma/2gtv(i, j, k).

21. The system for denoising an image according to claim 18 wherein the dot value m is determined to eliminate a dot at (i, j, k) and the m is defined by:

$$m = \frac{1}{a}\min(|f(i-1, j, k) - f(i, j, k)|, |f(i+1, j, k) - f(i, j, k)|,$$
$$|f(i, j-1, k) - f(i, j, k)|, |f(i, j+1, k) - f(i, j, k)|),$$

where a is the predetermined value.

22. The system for denoising an image according to claim 21 wherein the isolated noise dot is eliminated by f(i, j, k)=f(i, j, k)+ma/4gtv(i, j, k).

23. The system for denoising an image according to claim 14 wherein said reconstruction device performs an iterative reconstruction technique.

24. The system for denoising an image according to claim 14 wherein said reconstruction device performs an analytic reconstruction technique.

25. The system for denoising an image according to claim 14 wherein said reconstruction device obtains an image estimate from the measured data, said reconstruction device forward projecting the image estimate using at least a single ray to generate reprojected data, said reconstruction device determining a difference between the reprojected data and the measured data, said reconstruction device updating the image estimate based upon the difference to generate an updated image, said reconstruction device repeating using the updated image as the image estimate.

26. The system for denoising an image according to claim 14 wherein said reconstruction device obtaining an image estimate from the measured data, said reconstruction device forward projecting the image estimate using at least a single ray to generate reprojected data, said reconstruction device determining a data difference between the reprojected data and the measured data, said reconstruction device back-projecting the data difference to generate a difference image, said reconstruction device updating the image estimate based upon the difference image to generate an updated image, said reconstruction device repeating using the updated image as the image estimate.

27. A method of denoising an image, comprising the steps of:
   i) determining a discrete gradient of total variation=sgn$(f_i - f_{i'-1})$−sgn$(f_{i'+1} - f_{i'})$ for each of the image pixels i, the discrete gradient indicating an increase, a decrease or an unknown;
   ii) changing a pixel value of each of the image pixels by a predetermined value according to the discrete gradient; and
   iii) repeating the steps i) and ii) until a predetermined condition is reached.

28. A system for denoising an image, comprising:
   a reconstruction device for reconstructing an image having image pixels from projection data; and
   a discrete Total Variation (TV) minimization unit for determining a discrete gradient of total variation= sgn$(f_i - f_{i'-1})$−sgn$(f_{i'+1} - f_{i'})$ for each of the image pixels i, the discrete gradient indicating an increase, a decrease or an unknown, said discrete Total Variation (TV) minimization unit changing a pixel value of each of the image pixels by a predetermined value according to the discrete gradient, said discrete Total Variation (TV) minimization unit repeating the determination of the discrete gradient and the change of the pixel value until a predetermined condition is reached.

* * * * *